United States Patent
Droogleever

[15] 3,641,824
[45] Feb. 15, 1972

[54] APPARATUS AND METHOD TO CONTROL DAMPING OF MOVABLE MEMBER IN MEASURING INSTRUMENTS

[72] Inventor: Koenraad Droogleever, Fortuyn Star Numanstraat 12, Groningen, Netherlands

[22] Filed: Mar. 20, 1969

[21] Appl. No.: 808,836

[30] Foreign Application Priority Data

Mar. 22, 1968 Netherlands..........................6804090

[52] U.S. Cl..............................................73/430, 177/189
[51] Int. Cl. .................................................G01d 11/10
[58] Field of Search................73/430, 432 A, 496; 177/185, 177/187, 189, 216; 248/358

[56] References Cited

UNITED STATES PATENTS

| | | |
|---|---|---|
| 1,214,507 | 2/1917 | Breitinger................................73/430 |
| 1,890,977 | 12/1932 | Kelley...................................177/189 X |
| 2,368,002 | 1/1945 | Cooper...................................73/430 X |
| 2,933,352 | 4/1960 | Hart...................................73/432 A X |
| 2,940,044 | 6/1960 | Warsaw .................................73/430 X |
| 3,096,837 | 7/1963 | Abbott et al. .....................177/185 UX |
| 3,174,565 | 3/1965 | Whitley...............................177/189 X |
| 3,193,033 | 7/1965 | Gifford ...................................177/185 |

*Primary Examiner*—Louis R. Prince
*Assistant Examiner*—Daniel M. Yasich
*Attorney*—Imirie, Smiley, Snyder and Butrum

[57] ABSTRACT

Static friction of a moving member which is guided by a shaft is eliminated by causing the shaft to rotate in a direction transverse to that of the moving member movement. The damping effected on the moving member is controlled through variation of the resultant frictional force acting between the shaft and movable member, such variation being effected by maintaining the friction component which resists rotation of the shaft substantially constant.

4 Claims, 2 Drawing Figures

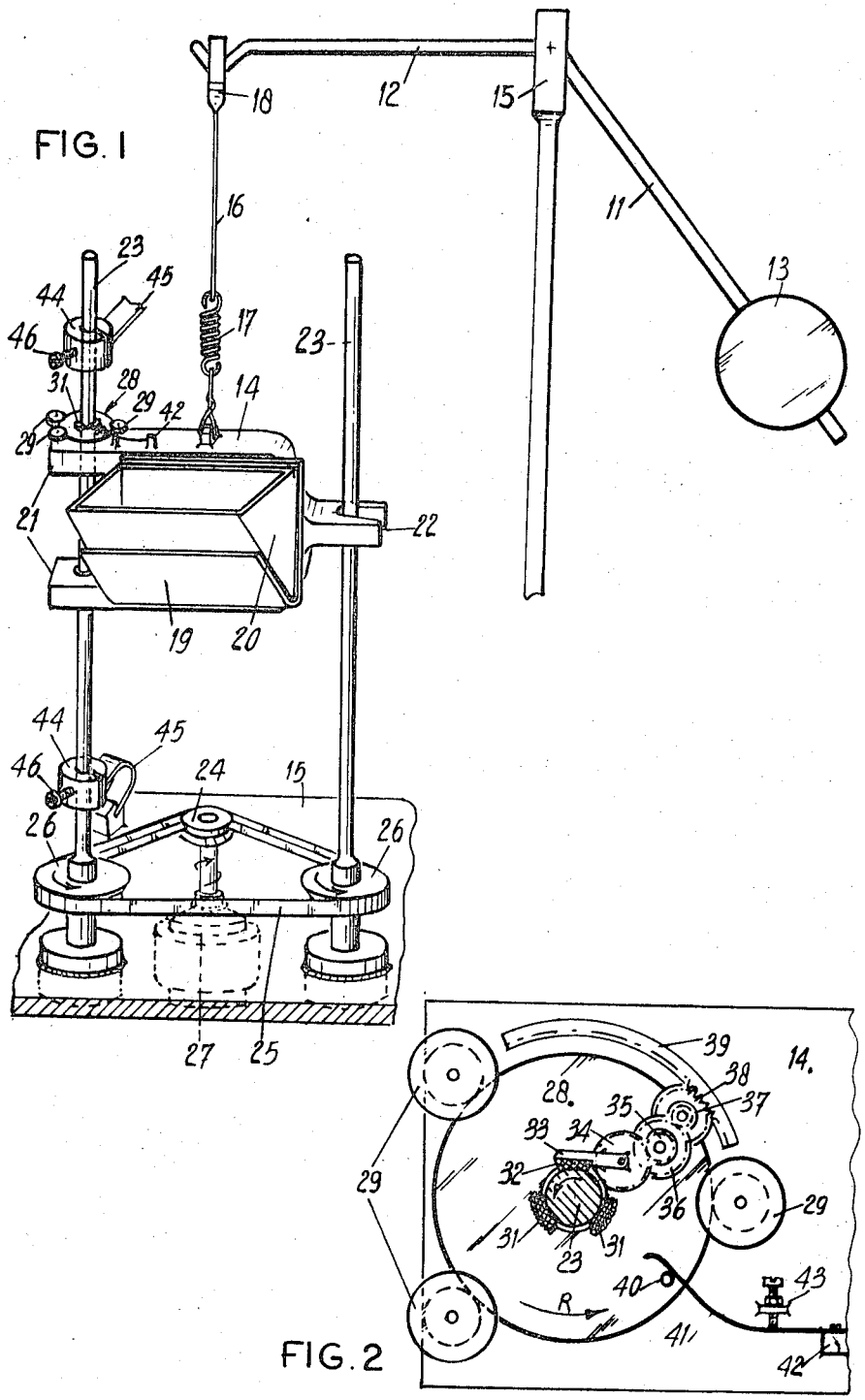

APPARATUS AND METHOD TO CONTROL DAMPING OF MOVABLE MEMBER IN MEASURING INSTRUMENTS

The invention relates to a method for controlling the damping of the movement of a moving member of a measuring instrument, e.g., the pointer pin of a dial instrument or the load bearer of a weighing apparatus, which moving member is guided in its movement by a guiding member. The invention, furthermore, relates to a measuring instrument, e.g., a dial instrument or a weighing apparatus, for application of such a method.

The invention has for its object to provide a controllable damping of a moving member of a measuring instrument, which damping should not or only negligibly be influenced by the variations which occur in the frictional forces to which the moving member is subjected during its movement.

To that end the invention proposes, with a method as mentioned, that the guiding member contacts the guided member with a surface of revolution the axis of revolution of which extends in parallel with the direction of movement of the guided member, exerts on the guided member a frictional force resulting from the guiding pressure directed normally to said surface of revolution and is subjected to a rotating movement relatively to the guided member and about the rotation axis of said surface of revolution in order to eliminate the static friction between the two members, the combination of frictional forces exerted on the guided member by the guiding member when guiding the guided member and as a result of its own rotational movement, respectively, being varied. According to the invention, the frictional force applied to the guided member may be varied if the speed of the guiding member is varied and/or if the guiding pressure which is exerted on the guided member by the guiding member is varied. The guiding pressure may be controlled simply in a mechanical or magnetic way in that case.

By application of any of these measures a damping of the moving member is obtained, which is independent on the static friction (only occurring at the start of the movement of the member) and, furthermore, may be adjusted or controlled at will. In the first place this is of great importance to the sensitivity and the accuracy to be obtained in a measuring instrument. In the second place this provides the possibility to limit the duration of a repetitive measuring cycle of substantially known length. This occurs, for example, when a large series of portions of material of about equal weight have to be accurately weighed in a weighing apparatus after having been roughly preweighed.

Naturally, it is also possible to deduct a control program from the velocity and/or the acceleration of the guided member in its movement path.

The invention also provides a measuring instrument in which the invented method is applied. Such a measuring instrument, e.g., a dial instrument or a weighing apparatus, is provided with a stationary frame in a way known per se, a member movable relatively to said frame, e.g., the rotatable pointer pin of a dial instrument or the load bearer of a weighing apparatus, and a guiding member for guiding said movable member in its movement, e.g., a bearing member of the pointer pin or a guiding rod of the lead bearer, one of the surfaces of said guiding member contacting a surface of said movable, guided member and exerting a guiding pressure thereon.

The invention prescribes that the contact surface of the guiding member is a surface of revolution and that means are provided furthermore for driving the guiding member rotatingly around the revolution axis of said surface of revolution and relatively to said guided member, and means for controlling the guiding pressure exerted on the guided member by the guiding member.

In that case the means for driving the guiding member rotatingly may include means for controlling the rotational velocity, whereas the means for controlling the guiding pressure exerted on the guided member by the guiding member may, according to the invention, advantageously be constituted by mechanical or magnetic means. In the case of mechanical means the invention prescribes that these means are provided with or consist of a friction member which is movably connected to the guiding member or to the guided member and acts on the contact surface of either the guided member of the guiding member, the position of which and therewith the guiding pressure exerted on the respective contact surface may be adjusted or controlled with the aid of an adjusting or controlling member which may be connected to a transducer for measuring one or more of the operational parameters of the movable members of the measuring instrument.

For the case already mentioned, in which the damping of the movement of the load bearer of a weighing apparatus has to be increased from a predetermined point in the movement path thereof, the invention finally provides a special solution in one form of the invention. The weighing apparatus, more generally the measuring instruments, should according to the invention, then be provided with adjustable means on at least one of the aforementioned members for so cooperating with the other one of said members that the damping to which the guided member is subjected in its path of movement is increased in a part of said path. The effect of these means is, that as soon as they start to operate, a certain change in the scale order of the dial of the measuring instruments occurs. This change may be wanted, for instance, at the tolerance limits of a measuring range. In order to obtain a very simple construction the invention teaches that the aforementioned adjustable means are constituted by springing abutment means which in their springing movements are guided by the guiding member with an adjustable friction force. The friction force exerted on the springing means serves for damping the elastic force which these means exert on the guided member as soon as this member has displaced the elastic abutment means along the guiding member.

The invention will not be elucidated in the description with reference to the accompanying drawings of some embodiments to which the invention is not limited however. In the drawings:

FIG. 1 a perspective view on a weighing apparatus having a damping control according to the invention;

FIG. 2, on a larger scale, a view from above on a detail of the weighing apparatus according to FIG. 1.

In FIG. 1 a weighing apparatus is represented having a damping control according to the invention. The apparatus is in this case an inclination balance having a balance beam, the arm 11 of which carries a counter weight 13 and the arm 12 of which carries a bearer 14 for the load to be weighed. The beam is supported in the conventional way by means of a knife bearing (not represented in the drawing) that bears on a support 15, only some parts of which have been represented in e drawing. The beam may swing in a vertical plane. The bearer 14 depends by means of a tread 16 and a spring 17 for smoothing out shocks when the container is charged from a strap 18 which is also suspended in the usual way at the end of the beam arm 12 by means of a knife bearing (not represented in the drawing). The bearer 14 is provided with a V-shaped sack 19 in which a container 20 containing the material to be weighed is loosely placed. The container 20 is weighed together with its contents. The container itself has a predetermined weight so that the deflection of the inclination balance constitutes also a measure for the weight of the containers' contents. According to the invention the bearer 14 is mounted by means of eyes 21, 22 respectively, enabling the bearer 14 to slide along vertical, round guiding rods 23 so that it can only move in a vertical direction, i.e., in the path destined for the weighing. The open eye 22 has so much space that the bearer 14 has only a line of contact with the guiding rod 23 therein. The rods 23 are rotatably supported in the support 15 and are driven through a rope drive 24, 25, 26 by a motor 27 during the weighing. As a consequence of the rotation of the guiding rods 23, the vertical friction component and hence the friction in the movement direction during the weighing are strongly reduced. The rotational velocity of the rods 23 and the bearing pressure exerted by the bearer 14 on the rods 23 determine the extent to which the friction is reduced and hence the magnitude of the damping which the bearer 14 is subjected to in its vertical weighing movements. With the aid of FIG. 2 it will now be elucidated in which way the invention makes use of this effect.

In FIG. 2 the method in which a rotating guiding rod 23 cooperates with the bearer 14 has been represented in more detail. A circular disc 28 is mounted on the bearer 14. The round disc can rotate against three guiding rolls 29 which are rotatably mounted on the bearer 14. The circular disc 28 has a central aperture 30 through which passes a guiding rod 23. On the disc 28 two bearing blocks 31 engaging the guiding rod 23 are mounted. Facing these bearing blocks 31 is a third bearing block 32 which is secured to a bearing arm 33. The bearing arm 33 is in turn secured against rotation relatively to a first gear 34 of a gear reduction system 34, 35, 36, 37, 38 which is also mounted on circular disc 28. The last gear wheel 38 of this system protrudes exteriorly off the circular disc 28 and engages an arcuate tooth rack section 39 secured to the bearer 14. The cooperation of the gear reduction system 34–38 with the tooth rack section 39 on the one hand and with the bearing arm 33 on the other hand has for its consequence that, upon rotation of the circular disc 28 in the rotation sense of the arrow R, the gear 38 and therewith the gear system 34–38 is driven by the tooth rack section 39 in such a way that the bearing arm 33 removes the bearing block 32 from the guiding rod 23 and thereby reduces the bearing pressure which is exerted on the guiding rod 23 by the movable bearing block 32 together with the bearing blocks 31 which are secured to the disc 28.

On the disc 28 is provided a pin 40 bearing against the one end of the leaf spring 41 the other end of which is fixedly secured to the bearer 14 in 42. The position of the spring end engaging the pin 40 in relation to the bearer 14 may be adjusted with the aid of an adjusting screw 43. The position of the leaf spring 41 determines on the one hand the position of the pin 40 and of the disc 28 fixedly secured thereto in relation to the bearer 14. On the other hand the position of the disc 28 in relation to the bearer 14 determines in turn the bearing pressure which the bearing block 32 exerts together with both bearing blocks 31 on the rotating guiding rod 23, as has been elucidated in the afore-going paragraph. Therefore, it is essentially the position of the leaf spring 41 (which may be adjusted with the aid of the adjusting screw 43) that determines the bearing pressure and therewith—together with the rotation velocity of the guiding rod 23, which in this embodiment is assumed to be a constant—the damping to which the bearer 14 is subjected during its rectilinear movement along guiding rod 23. In the embodiment here described not only the damping is controlled with the aid of the adjusting screw 43, but furthermore this damping is stabilized by the elastic force of the leaf spring 41. In order to elucidate this latter phenomenon, the behavior of the parts which are mounted on the bearer 41 will not be considered for an increase of the bearing pressure exerted on the rod 23 by the bearing blocks 31 and 32. First it is assumed that a position of equilibrium has been reached. In that state the disc 28 is stationary with regard to the bearer 14, whereas the guiding rod 23 is rotating in the rotation sense of the arrow R and is exposed to a certain bearing pressure by the bearing blocks 31 and 32. If now the friction resulting from this bearing pressure increases, the guiding rod 23 will exert a rotational torque on the disc 28 by means of the friction increase, whereby the disc will start to rotate in the rotation sense of the arrow R. As has already been elucidated, a rotation of the disc 28 relatively to the bearer 14 will result through the tooth rack section 39, the gear reduction system 34—38 and the bearing arm 33 directly in a reduction of the pressure exerted by the bearing block 32 on the guiding rod 23, whereby the supposed increase of friction is resisted. Thereby also the torque exerted on the disc 28 is terminated, the leaf spring 41 bearing against the pin 40 which had been slightly moved by the rotation of the disc 28, will try to push back the pin 40 and to adjust a new state of equilibrium. If the change of friction is one of short duration instead of being a permanent increase, the leaf spring 41 will thus restore the original state of equilibrium. This equilibrium is therefore determined by the adjustment of the adjusting screw 43. A decrease of the bearing pressure will cause the system to move in the inverse direction because the left end of the spring 41 will push back the disc 28 in a rotational sense contrary to that of the arrow R and thus will restore the state of equilibrium, as soon as it senses a decrease in the force exerted thereon by the pin 40. The frictional forces to which the bearer 14 is subjected and the damping to which it is subjected in its vertical movements are thus controlled by the adjustment of the screw 43 and stabilized by the effect of the leaf spring 41.

At the underside and at the upperside of the path followed by the bearer 14 along the guiding rods 23 a block 44 has been mounted on the left guiding rod 23. The block 44 is coupled with the support 15 through a U-shaped bent leaf spring 45 and is secured thereby against rotation relatively to the support 15 as a result of the frictional force exerted thereon by the rotating guiding rods 23. The frictional force to which the block 44 is exposed may be adjusted with the aid of the adjustment screw 46.

The weight of the block 44 along the guiding rod 23 is so chosen that the bearer 14 abuts against the block at the end of its path. The bearer is then braked in its movement by the leaf spring 45 through the block, the leaf spring being stressed. The frictional force between the block and the guiding rod, which has been adjusted with the aid of the screw 46, provides a damping of the elastic force which the spring 45 exerts on the bearer 14 through the block 44. Thereby it is prevented that the spring, after having braked the bearer 14 in its downward movement, pushes the bearer upwardly again with too high a force. As a consequence of this construction the weighing apparatus represented here undergoes at the end of the path of movement of the bearer 14 a change in the order of the dial scale, which is especially of importance when measurements within predetermined measuring ranges or tolerances have to be conducted. Moreover, it is evident that in this way the damping at the end of the path of a load bearer 14 moving in a vertical swinging movement along the guiding rod 23 is increased in such a way that the duration of this swinging movement, which influences the duration of the measuring cycle, is reduced. This is an advantage when a large number of corresponding measuring cycles has to be carried out in a sequence, which may be the case with an automatic weighing-sorting installation.

What I claim is:

1. In a measuring instrument, in combination:
  a frame;
  guiding means comprising at least one shaft rotatably mounted on said frame;
  means for rotating said shaft;
  guided means mounted on said shaft for movement relative thereto within a plane parallel to or containing the axis of said shaft;
  measuring means for moving said guided means relative to said shaft with increasing velocity toward an equilibrium position representing the condition being measured;
  said guided means including friction means engaging said shaft and moving with said guided means so as to produce a resultant frictional force which has one component resisting rotation of said shaft and a second component resisting movement of said guided member, the value of said second component tending to increase naturally as said velocity increases; and
  means responsive to said one component to maintain said one component substantially constant, whereby said guided means is effectively damped.

2. In a measuring instrument according to claim 1 wherein said guided means engages said shaft for sliding movement relative thereto, said guided means comprising a bearer, a disc on said bearer, and a plurality of friction elements carried by said disc and engaging said shaft.

3. In a measuring instrument according to claim 2 wherein said disc is rotatably mounted on said bearer whereby said disc tends to rotate with said shaft, said last means comprising a spring on said bearer and engaging said disc to oppose rotation thereof with said shaft, an arcuate rack section on said bearer, gear means on said disc engaging said rack section, and one of said friction elements being fixed to said gear means.

4. A method for controlling the damping effect on a movable member of a measuring instrument while such movable member is moving within a plane at increasing velocity toward an equilibrium position corresponding to a value being measured, which comprises the steps of:

a. maintaining the movable member in frictional engagement with a rotating shaft whose axis is within said plane, whereby the rotation of the shaft and the movement of the movable member cooperate to produce a resultant frictional force therebetween which is the vector sum of one friction component resisting rotation of the shaft and a second friction component resisting movement of the movable member, the value of said second component tending to increase naturally as the velocity of the movable member increases; and b. varying the resultant frictional force in response to changing conditions to maintain said one component substantially constant.

* * * * *